US012763989B2

(12) United States Patent
Gabin et al.

(10) Patent No.: US 12,763,989 B2
(45) **Date of Patent: *Oct. 13, 2026**

(54) METHOD AND APPARATUS FOR PERFORMING NETWORK IDENTIFICATION VERIFICATION

(71) Applicant: AT&T Intellectual Property I, L.P., Atlanta, GA (US)

(72) Inventors: Jay Gabin, Dexter, ME (US); Stephanie Parlamas, Colts Neck, NJ (US); Karen Mullis, Loganville, GA (US); Chris Rapposelli-Manzo, Manasquan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 128 days.

This patent is subject to a terminal disclaimer.

(21) Appl. No.: 18/955,402

(22) Filed: Nov. 21, 2024

(65) Prior Publication Data

US 2025/0088390 A1 Mar. 13, 2025

Related U.S. Application Data

(63) Continuation of application No. 18/342,598, filed on Jun. 27, 2023, now Pat. No. 12,192,033.

(51) Int. Cl.

*H04L 12/46* (2006.01)
*H04L 41/0866* (2022.01)
*H04L 61/3015* (2022.01)

(52) U.S. Cl.

CPC ...... *H04L 12/4679* (2013.01); *H04L 41/0866* (2013.01); *H04L 61/3015* (2013.01)

(58) Field of Classification Search

CPC ............. H04L 12/4679; H04L 41/0866; H04L 61/3015

See application file for complete search history.

(56) References Cited

U.S. PATENT DOCUMENTS 6,640,244 B1 10/2003 Bowman-Amuah
12,192,033 B1 * 1/2025 Gabin ................ H04L 41/0866

(Continued)

*Primary Examiner* — Nicholas P Celani

(74) *Attorney, Agent, or Firm* — Guntin & Gust, PLC; Erik Boyd

(57) ABSTRACT

Aspects of the subject disclosure may include, for example, obtaining a reference data set comprising a plurality of reference data records, wherein the reference data set is associated with a cloud infrastructure, and wherein each of the reference data records comprises a reference network name associated with one of a plurality of reference networks that is configured within the cloud infrastructure and a corresponding reference Virtual Local Area Network (VLAN) identifier for the one of the plurality of reference networks that is configured within the cloud infrastructure; obtaining an input data set comprising a plurality of input data records, wherein the input data set is associated with the cloud infrastructure, and wherein each of the input data records comprises a network name associated with one of a plurality of networks that is being considered for configuration within the cloud infrastructure and a corresponding VLAN identifier for the one of the plurality of networks that is being considered for configuration within the cloud infrastructure; analyzing the reference data records and the input data records in order to identify a set of one or more errors; and tagging one or more records in the input data set with each corresponding occurrence of each error. Other embodiments are disclosed.

20 Claims, 11 Drawing Sheets

(56) References Cited

U.S. PATENT DOCUMENTS

| | | | |
|---|---|---|---|
| 2011/0149800 | A1 | 6/2011 | Ryan et al. |
| 2020/0034462 | A1 | 1/2020 | Narayanasamy et al. |
| 2021/0368347 | A1 | 11/2021 | Wang et al. |

* cited by examiner

200

230

250

2000

2100

300

600

METHOD AND APPARATUS FOR PERFORMING NETWORK IDENTIFICATION VERIFICATION

CROSS REFERENCE TO RELATED APPLICATION(S)

This application is a continuation of U.S. patent application Ser. No. 18/342,598, filed Jun. 27, 2023. All sections of the aforementioned application(s) and/or patent(s) are incorporated herein by reference in their entirety.

FIELD OF THE DISCLOSURE

The subject disclosure relates to network identification verification.

BACKGROUND

The networking requirements for the cloud infrastructure supporting virtual network functions (VNFs) are precise. Virtual network functions and/or containerized network functions (CNFs) must typically connect to pre-defined networks for bearer or Operations, Administration, and Maintenance (OA&M) traffic. These networks must typically be created with specific parameters defining their operational characteristics. These networks also must typically follow a specific naming convention and are assigned a specific identifier that cannot be used by a network of another name or with different operational characteristics in the same cloud region/tenant. Each virtual network function and/or containerized network function must typically specify exactly which network(s) to which its ports must connect. During VNF/CNF orchestration, it is critical that there are no mistakes in the network definitions both in the network models and in the VNF/CNF models themselves.

Defining the network characteristics, conventions, and port identifiers has traditionally been manually created, updated, and tracked, which can be a source of mistakes. Errors can result in failed network or VNF/CNF instantiation to the cloud infrastructure, and can require extensive time-consuming troubleshooting to understand what went wrong and how to fix it. In this regard, it was traditionally necessary to ensure that the network identifiers were not reused (or there would be a routing collision and many networks and VNF/CNF instantiations would need to be torn down and re-instantiated). However, the checks to prevent reuse often were either not implemented, or the manual records of identifier-to-network mappings were incorrect.

BRIEF DESCRIPTION OF THE DRAWINGS

Reference will now be made to the accompanying drawings, which are not necessarily drawn to scale, and wherein.

DETAILED DESCRIPTION

Figure 1:
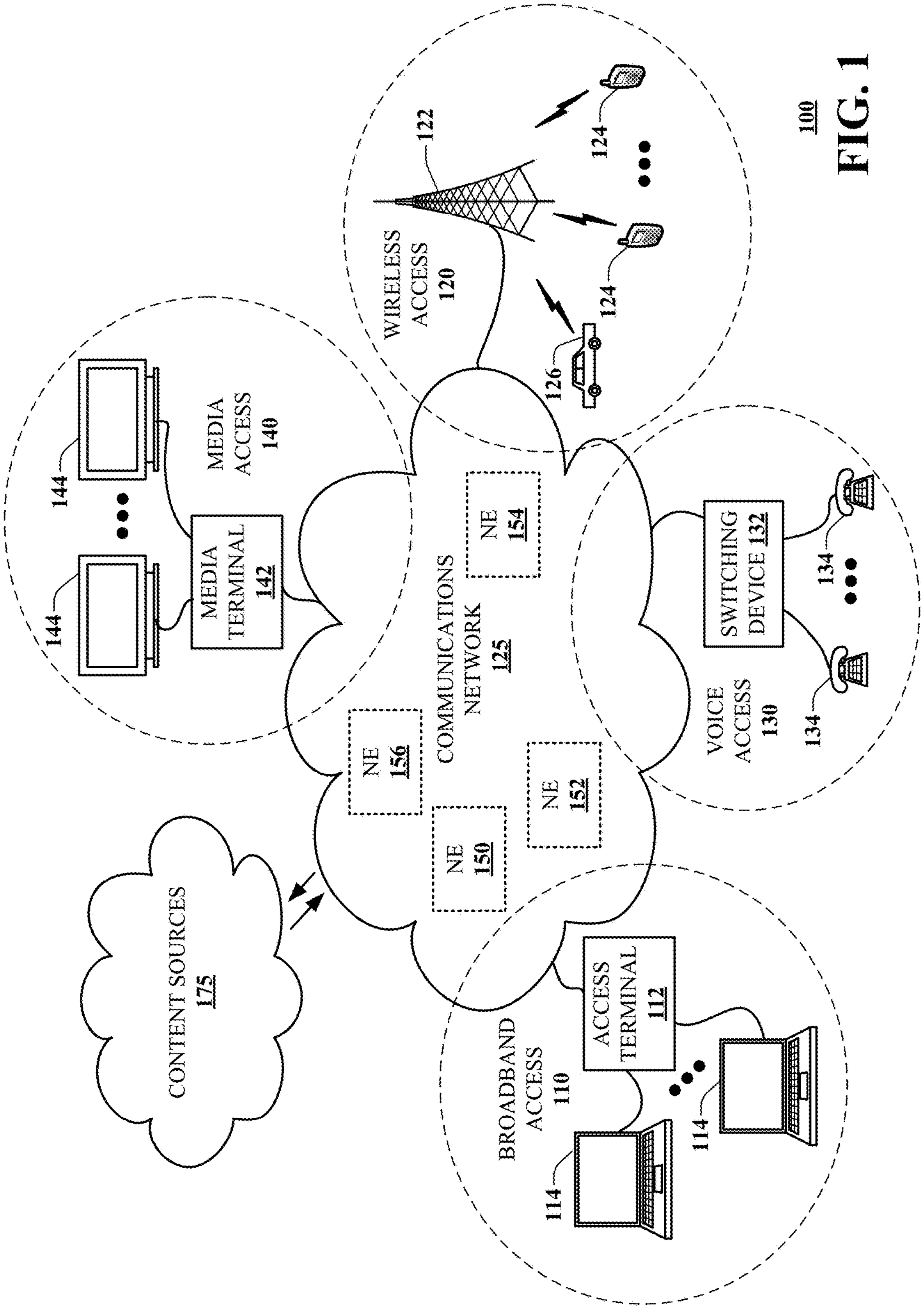
FIG. 1 is a block diagram illustrating an example, non-limiting embodiment of a communication network in accordance with various aspects described herein.

The subject disclosure describes, among other things, illustrative embodiments for assigning (for a cloud infrastructure) various network names and corresponding identifiers to respective records (e.g., records in a data set, records in a data file, records in a spreadsheet, records in a database, or the like) and/or for verifying (for the cloud infrastructure) various network names and corresponding identifiers in respective records (e.g., records in a data set, records in a data file, records in a spreadsheet, records in a database, or the like). Other embodiments are described in the subject disclosure.

One or more aspects of the subject disclosure include an automated ability to output an error-free up-loadable instantiation-ready set of networks after verifying that network identifiers are unique in their cloud zone (or network site, or network cloud pod) and that network identifier assignments are unique within their environment and are implemented without human error.

One or more aspects of the subject disclosure include a device, comprising: a processing system including a processor; and a memory that stores executable instructions that, when executed by the processing system, facilitate performance of operations, the operations comprising: obtaining a reference data set comprising a plurality of reference data records, wherein the reference data set is associated with a cloud infrastructure, and wherein each of the reference data records comprises a reference network name associated with one of a plurality of reference networks that is configured within the cloud infrastructure and a corresponding reference Virtual Local Area Network (VLAN) identifier for the one of the plurality of reference networks that is configured within the cloud infrastructure; obtaining an input data set comprising a plurality of input data records, wherein the input data set is associated with the cloud infrastructure, and wherein each of the input data records comprises a network name associated with one of a plurality of networks that is being considered for configuration within the cloud infrastructure and a corresponding VLAN identifier for the one of the plurality of networks that is being considered for configuration within the cloud infrastructure; analyzing the reference data records and the input data records in order to identify a set of one or more errors, wherein each error is characterized by: presence in the input data set of more than one record having a same network name; presence in the input data set of more than one record having a same VLAN identifier; presence in the input data set of a record having a first network name associated with a first VLAN identifier, the first network name matching a first reference network name in the reference data records, and the first reference network name associated with a first reference VLAN identifier that does not match the first VLAN identifier; or any combination thereof; and tagging one or more records in the input data set with each corresponding occurrence of each error.

One or more aspects of the subject disclosure include a non-transitory machine-readable medium comprising executable instructions that, when executed by a processing system including a processor, facilitate performance of operations, the operations comprising: receiving a reference data set comprising a plurality of reference data records, wherein the reference data set is associated with a cloud infrastructure, and wherein each of the reference data records comprises a reference network name associated with one of a plurality of reference networks that is configured within the cloud infrastructure and a corresponding reference Virtual Local Area Network (VLAN) identifier for the one of the plurality of reference networks that is configured within the cloud infrastructure; receiving an input data set comprising a plurality of input data records, wherein the input data set is associated with the cloud infrastructure, and wherein each of the input data records comprises a network name associated with one of a plurality of networks that is being considered for configuration within the cloud infrastructure and a corresponding VLAN identifier for the one of the plurality of networks that is being considered for configuration within the cloud infrastructure; identifying, via analysis of the reference data records and the input data records, a set of one or more discrepancies, wherein each discrepancy is characterized by: presence in the input data set of a record having a network name that is not identical to any reference network name in the reference data set; and tagging one or more records in the input data set with each corresponding occurrence of each discrepancy.

One or more aspects of the subject disclosure include a method, comprising: obtaining, by a processing system including a processor, a reference set of one or more reference data files comprising a plurality of reference data records, wherein the reference set of the one or more reference data files is associated with a cloud infrastructure, and wherein each of the reference data records comprises a reference network service model name associated with one of a plurality of reference networks that is configured within the cloud infrastructure and a corresponding reference Virtual Local Area Network (VLAN) identifier for the one of the plurality of reference networks that is configured within the cloud infrastructure; obtaining, by the processing system, an input data file comprising a plurality of input data records, wherein the input data file is associated with the cloud infrastructure, and wherein each of the input data records comprises a network service model name associated with one of a plurality of networks that is being considered for configuration within the cloud infrastructure and a corresponding VLAN identifier for the one of the plurality of networks that is being considered for configuration within the cloud infrastructure; analyzing the reference data records and the input data records in order to identify a set of one or more errors, wherein each error is characterized by: presence in the input data file of more than one record having a same network service model name; presence in the input data file of more than one record having a same VLAN identifier; presence in the input data file of a record having a first network service model name associated with a first VLAN identifier, the first network service model name matching a first reference network service model name in the reference data records, and the first reference network service model name associated with a first reference VLAN identifier that does not match the first VLAN identifier; or any combination thereof; analyzing the reference data records and the input data records in order to identify a set of one or more warnings, wherein each warning is characterized by presence in the input data file of a record having a network service model name that is not identical to any reference network service model name in the reference data set; tagging one or more records in the input data file with each corresponding occurrence of each error; tagging one or more records in the input data file with each corresponding occurrence of each warning; and utilizing a revised version of the input data file, in which each error and warning has been addressed, to instantiate a new instance of the cloud infrastructure.

Referring now to FIG. 1, a block diagram is shown illustrating an example, non-limiting embodiment of a system 100 in accordance with various aspects described herein. For example, system 100 can facilitate in whole or in part assigning (for a cloud infrastructure) various network names and corresponding identifiers to respective records (e.g., records in a data set, records in a data file, records in a spreadsheet, records in a database, or the like) and/or verifying (for the cloud infrastructure) various network names and corresponding identifiers in respective records (e.g., records in a data set, records in a data file, records in a spreadsheet, records in a database, or the like). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
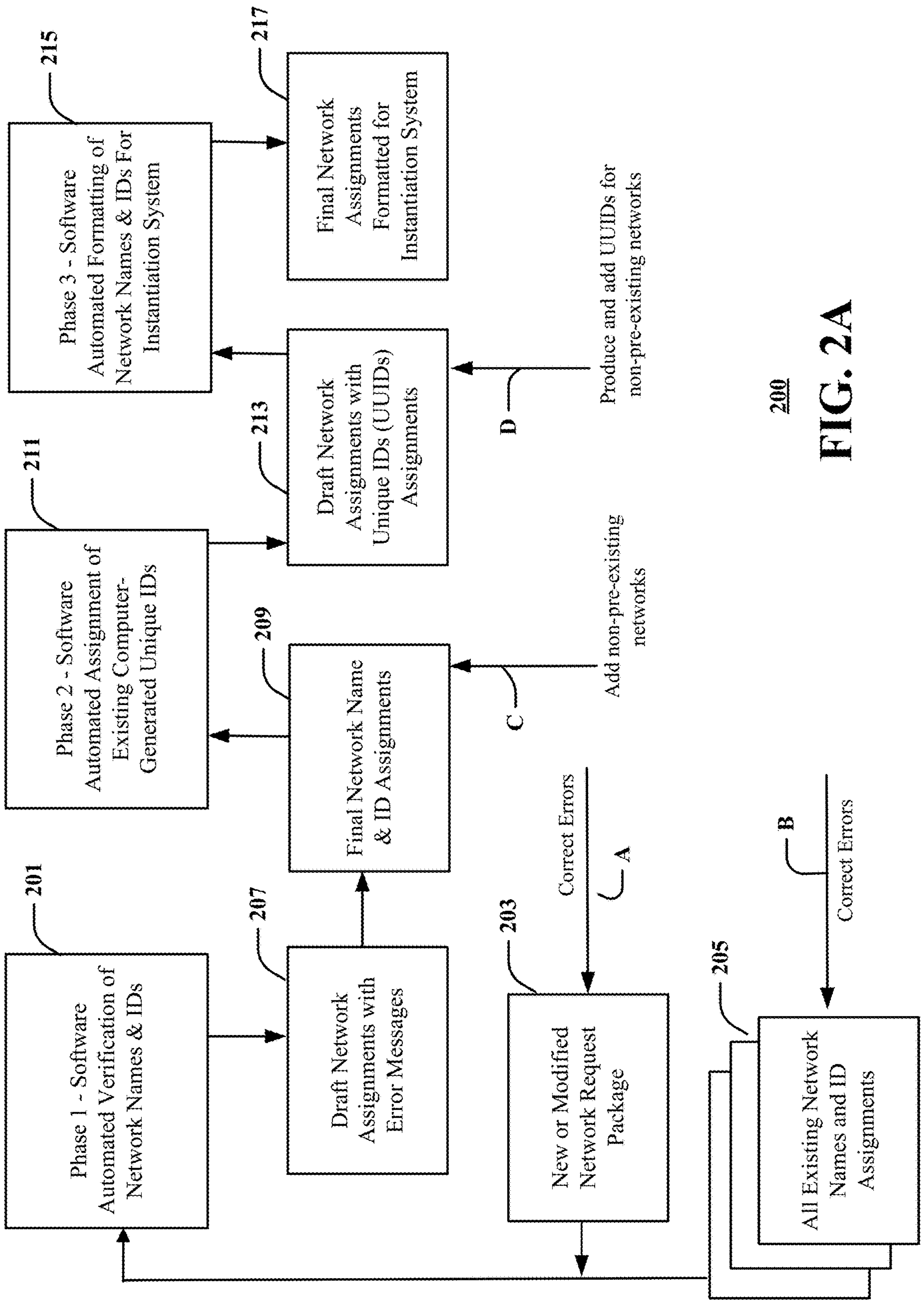
FIG. 2A is a block diagram illustrating an example, non-limiting embodiment of a system (which can function fully or partially within the communication network of FIG. 1) in accordance with various aspects described herein.

Referring now to FIG. 2A, this is a block diagram illustrating an example, non-limiting embodiment of a system 200 (which can function fully or partially within the communication network of FIG. 1) in accordance with various aspects described herein. As seen in this figure, a network identification verification process can comprise three phases, as discussed below.

Phase 1 of this process (see element 201) can comprise making network assignments. In this phase, inputs can comprise a list of network names paired with Virtual Network IDs (VLAN-ID). This list can be provided in the form of a request package 203 (e.g., New or Modified Network Request Package). In one embodiment, the request package 203 can be obtained from, for example, one or more network engineers. In one embodiment, the request package 203 can be manually generated. In one embodiment, the request package 203 can be automatically computer-generated. In one embodiment, there can be a process to correct errors in the request package 203 (see arrow "A"). In one embodiment, the process to correct errors in the request package 203 can be implemented manually. In one embodiment, the process to correct errors in the request package 203 can be implemented automatically via computer.

Still referring to FIG. 2A, the inputs for phase 1 can further comprise one or more already existing cloud zone network model databases (see element 205). These existing cloud zone network model databases 205 (which are sometimes referred to herein as reference databases) can include data comprising Network Name/Virtual Network ID/Unique IDs (UUIDs). In one embodiment, the existing cloud zone network model databases 205 can be obtained from, for example, one or more network engineers. In one embodiment, the existing cloud zone network model databases 205 can be manually generated. In one embodiment, the existing cloud zone network model databases 205 can be automatically computer-generated. In one embodiment, there can be a process to correct errors in the existing cloud zone network model databases 205 (see arrow "B"). In one embodiment, the process to correct errors in the existing cloud zone network model databases 205 can be implemented manually. In one embodiment, the process to correct errors in the existing cloud zone network model databases 205 can be implemented automatically via computer.

Still referring to FIG. 2A, the inputs for phase 1 can be used to generate an output of errors and warnings (see element 207). These errors and warnings can include duplicate network names assigned to the same virtual network ID, incorrect network roles, missing sub networks, network names not found in the already existing pool of cloud zone network databases, etc. In one embodiment, there can be a process to correct errors and/or warnings. In one embodiment, the process to correct errors and/or warnings can be implemented manually. In one embodiment, the process to correct errors and/or warnings can be implemented automatically via computer. In addition, non-pre-existing networks (and/or new network role data) can be added (manually and/or via a computer implemented process—see arrow "C"). These steps can result in a set of final network names and ID assignments (see element 209).

Still referring to FIG. 2A, phase 2 of this process (see element 211) can comprise assignment of unique machine-generated IDs (UUIDs). In this phase, the cloud zone database without errors (see element 209) is used as an input into which UUIDs from pre-existing cloud zone networks are auto-assigned. In one embodiment, the same set of network UUIDs are used throughout the entire network (all cloud zones) for each particular environment. In one embodiment, phase 2 can be configured to output for multiple environments—each of which have their own unique IDs (UUIDs). For example, there may be three lab environments and one production environment. So, in this example, the tool will output 4 distinct sets of Network-UUID pairs to the new cloud zone database. Further, a process to "model" new networks (that is, ones that are not found in the already existing pool) can be performed. More specifically, using network modeling tools, networks can be created and UUIDs can be generated for the network names that were not found for a given cloud zone. These UUIDs thus created can be added to the output from the above-mentioned phase 2 process (see arrow "D) to result in a set of draft network assignments with unique IDs (UUIDs) (see element 213).

Still referring to FIG. 2A, phase 3 of this process (see element 215) can comprise automated formatting of network names & IDs for instantiation system. The output of this phase 3 process can be a set of final network assignments formatted for an instantiation system (see element 217). Further, this set of final network assignments (re)formatted for the instantiation system can then be uploaded, transmitted, or the like to a desired instantiation system in order to facilitate network operation.

Figure 2B:
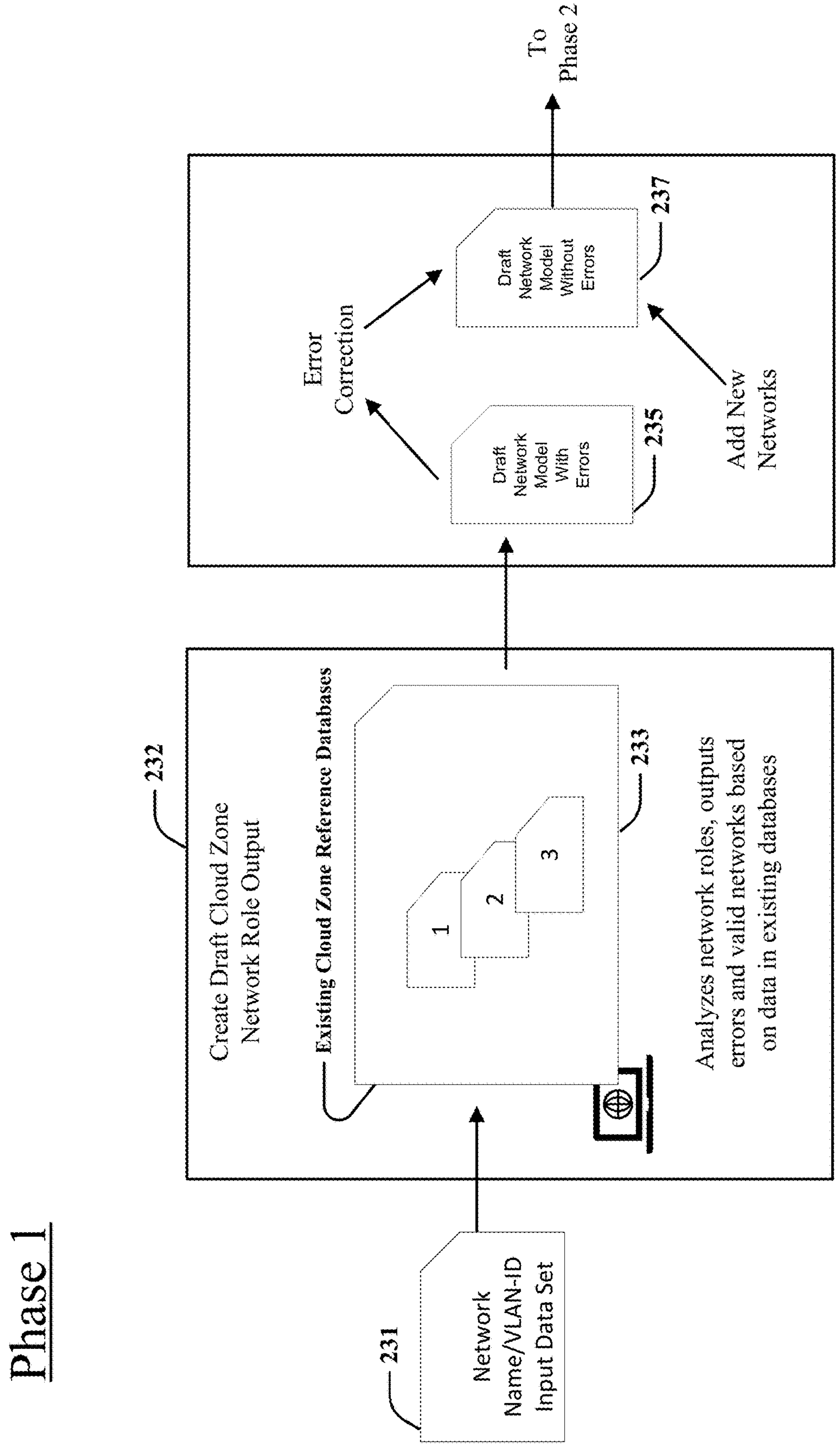
FIG. 2B is a block diagram illustrating an example, non-limiting embodiment of a system (which can implement certain details of phase 1 of FIG. 2A) in accordance with various aspects described herein.

Referring now to FIG. 2B, this is a block diagram illustrating an example, non-limiting embodiment of a system 230 (which can implement certain details of phase 1 of FIG. 2A) in accordance with various aspects described herein. As seen in this figure, a network name/VLAN-ID input data set 231 is input to an analysis/creation process 232. This analysis/creation process 232 creates draft cloud zone network role output (using data set 231 and existing cloud zone reference databases 233). This analysis/creation process 232 can thus analyze network roles, and output errors (along with valid networks) based on data in the existing databases. Further, as a result of process 232, a draft network model with errors 235 can be created. After error correction, a draft network model without errors 237 results. In one embodiment, the process to correct errors in the draft network model with errors 235 can be implemented manually. In one embodiment, the process to correct errors in the draft network model with errors 235 can be implemented automatically via computer. In addition, the draft network model without errors 237 can have information related to new networks added thereto. Finally, the draft network model without errors 237 can be used as input to phase 2.

Figure 2C:
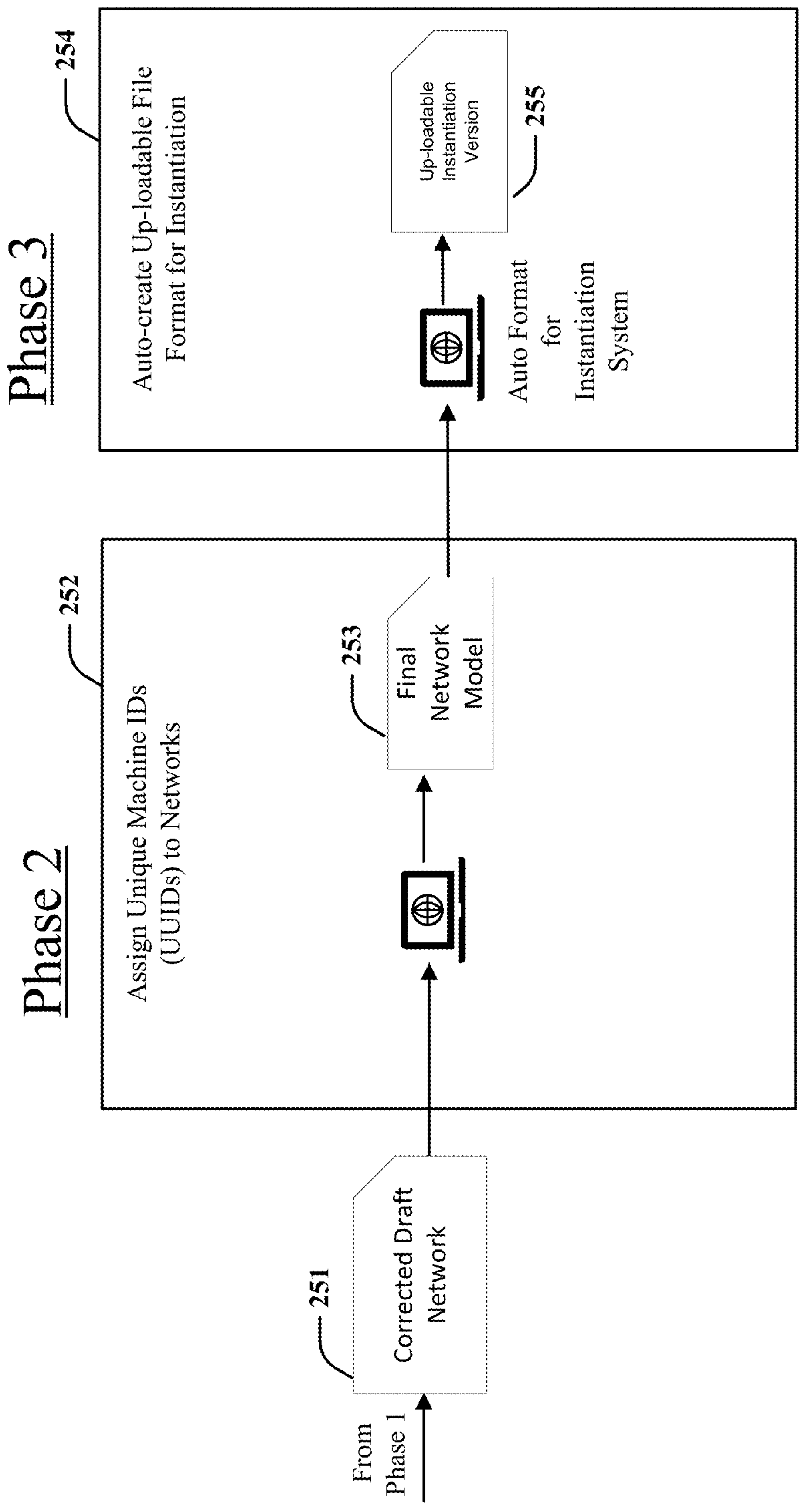
FIG. 2C is a block diagram illustrating an example, non-limiting embodiment of a system (which can implement certain details of phases 2 and 3 of FIG. 2A) in accordance with various aspects described herein.

Referring now to FIG. 2C, this is a block diagram illustrating an example, non-limiting embodiment of a system 250 (which can implement certain details of phases 2 and 3 of FIG. 2A) in accordance with various aspects described herein. As seen in this figure, corrected draft network data 251 (from phase 1) is input to an assignment process 252. This assignment process 252 can automatically assign unique machine IDs (UUIDs) to the networks. More particularly, this assignment process 252 can map existing networks to their UUIDs (e.g., machine-generated UUIDs). Further, this assignment process 252 can include manually creating UUIDs for new networks in a modeling system and manually inserting the new UUIDs into the network model database. In various embodiments, phase 2 can be run multiple times (e.g., for different lab environments and for production). The assignment process 252 can result in a final network model 253.

Still referring to FIG. 2C, the final network model 253 is input to phase 3, for an auto-creation process 254. The auto-creation process 254 can create an up-loadable file 255 (which is formatted for use by an instantiation system).

Reference will now be made to certain operations according to another embodiment. In this embodiment, the program begins a first step by reading in the incomplete network data that requires network and identification assignment. Data is stored in an internal data structure (as shown in the example, below) to allow subsequent processing to proceed:

```
[
  {
    rowNumber: 1,
    networkName: 'cdr_direct_net_1'
    subnetName: 'subnet_1',
    vlanid: 1882,
    physnetName: 'sriovnet1'
  },
  {
    rowNumber: 2,
    networkName: 'cdr_direct_net_2'
    subnetName: 'subnet_1',
    vlanid: 1882,
    physnetName: 'sriovnet2'
  },
  {
    rowNumber: 3,
    networkName: 'protected_net_1',
    subnetName: 'subnet_1',
    vlanid: 1900,
    physnetName: 'ovsnet'
  },
  etc...
```

In the next step the program reads in all reference data files, building data structures (as shown in the example below) required for the subsequent validation and assignment steps:

```
{
  rowNumber: 11,
  filename: 'Network_Names_Example1.xlsx',
  networkServiceModelname: +protected_net tenant network+,
  modelType: 'Tenant 1',
  trunked: undefined,
  nmrole: 'protected_net_1_related',
  heatrole: undefined,
  vlanid: 1900,
  relatedNetworks: [ ],
},
etc.
{
  env: 'PROD',
  rowNumber: 12,
  filename: 'Network_Names_Example1.xlsx',
  baseNetworkName: 'mgmt_net',
  modelType: 'Tenant',
  networkServiceModelname: 'mgmt_net tenant network'
  vlanid: 1905,
  nmrole: 'mgmt_net_1_related',
  invariantUUID: 'fe9e5ce4-374b-4a01-a38e-a7bea86e4d8d'
  versionUUID: 'ase38d4d-68e3-475f-9bc5-aaec63aefbb6',
}
```

The program then uses the reference data to validate the data in the incomplete network data file, and to produce a draft complete network data file. A manual step can be used to review this output and to make any necessary corrections before proceeding to the assignment phase based on already existing assignments found in the reference files (any new networks may require a manual step to create and assign their identifiers).

Next, in the assignment phase, the reference data is used to assign network names and identifiers of already existing networks for this given cloud location (thereby creating the network data file for orchestration). For example, note above where invariant and version identifiers are read from the reference data to be assigned to the network data currently being processed. This process can be illustrated by the following fragment of pseudo-code:

```
["S1", "S2", "PROD"].forEach((env) => <
  obj.invariantUUID = "";
  obj.versionUUID = "",
  let res;
  res = getNrEnvRef(
    env,
    entry.nmrole,
    entry.vlanid
  );
  if (res !== null) {
    obj.invariantUUID = res.invariantUUID;
    obj.versionUUID = res.versionUUID;
  }
  addEnvSheetRow(env, obj);
});
```

Referring now to Tables 1-2 below, examples of data record structures according to various embodiments are shown.

TABLE 1

| Network Service Model Name | Model Type | Trunked? | Network Role in Network Model | Network Role in VNF Heat Template | VLAN Assignment | Related Network Role A | Related Network Role B |
|---|---|---|---|---|---|---|---|

TABLE 2

| Base Network Name | Model Type | Network Service Model Name | VLAN | Network Role in Network Model | Invariant UUID | Variant UUID |
|---|---|---|---|---|---|---|

Figure 2D:
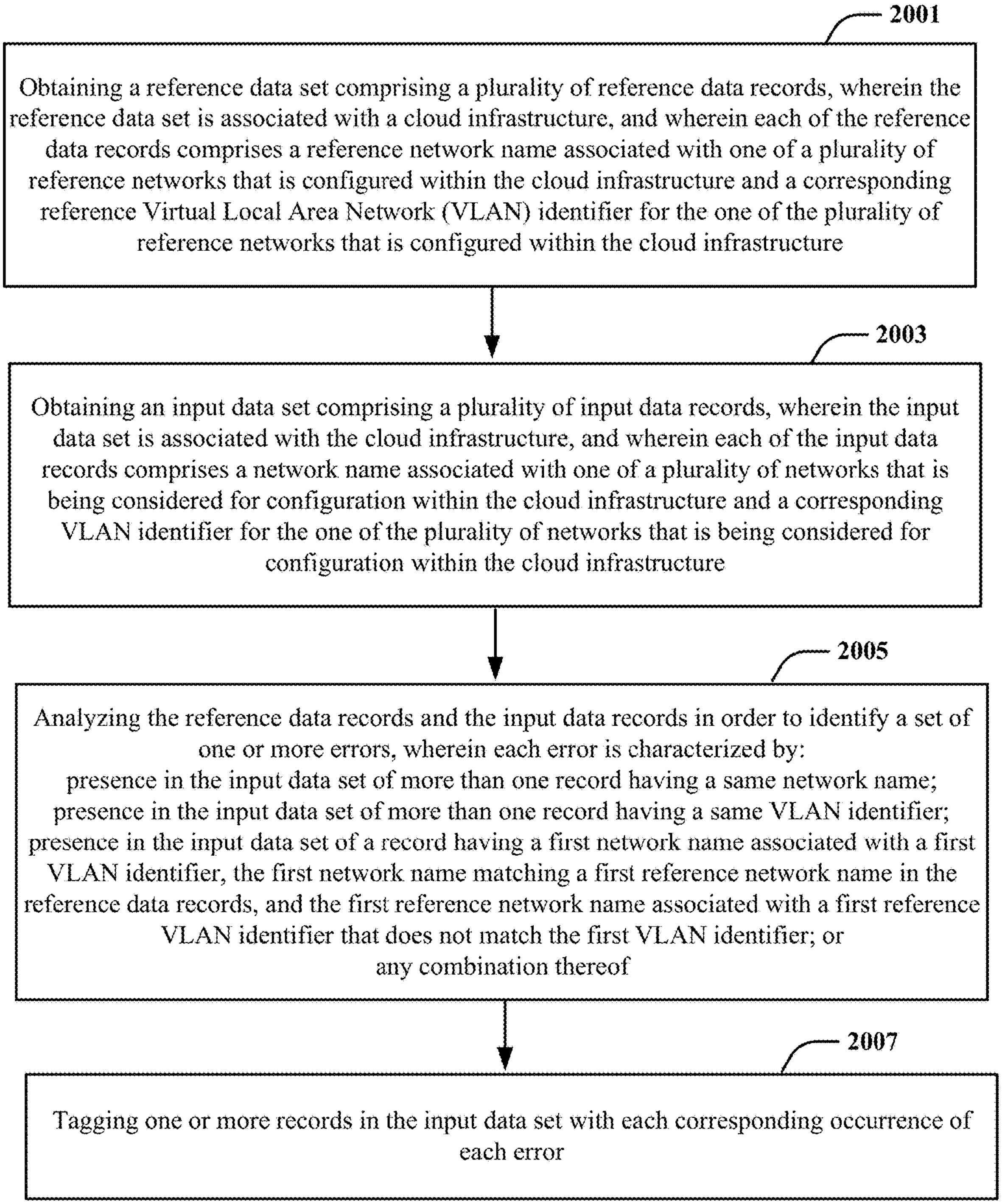
FIG. 2D depicts an illustrative embodiment of a method in accordance with various aspects described herein.

Referring now to FIG. 2D, various steps of a method 2000 according to an embodiment are shown. As seen in this FIG. 2D, step 2001 comprises obtaining a reference data set comprising a plurality of reference data records, wherein the reference data set is associated with a cloud infrastructure, and wherein each of the reference data records comprises a reference network name associated with one of a plurality of reference networks that is configured within the cloud infrastructure and a corresponding reference Virtual Local Area Network (VLAN) identifier for the one of the plurality of reference networks that is configured within the cloud infrastructure. Next, step 2003 comprises obtaining an input data set comprising a plurality of input data records, wherein the input data set is associated with the cloud infrastructure, and wherein each of the input data records comprises a network name associated with one of a plurality of networks that is being considered for configuration within the cloud infrastructure and a corresponding VLAN identifier for the one of the plurality of networks that is being considered for configuration within the cloud infrastructure. Next, step 2005 comprises analyzing the reference data records and the input data records in order to identify a set of one or more errors, wherein each error is characterized by: presence in the input data set of more than one record having a same network name; presence in the input data set of more than one record having a same VLAN identifier; presence in the input data set of a record having a first network name associated with a first VLAN identifier, the first network name matching a first reference network name in the reference data records, and the first reference network name associated with a first reference VLAN identifier that does not match the first VLAN identifier; or any combination thereof. Next, step 2007 comprises tagging one or more records in the input data set with each corresponding occurrence of each error.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
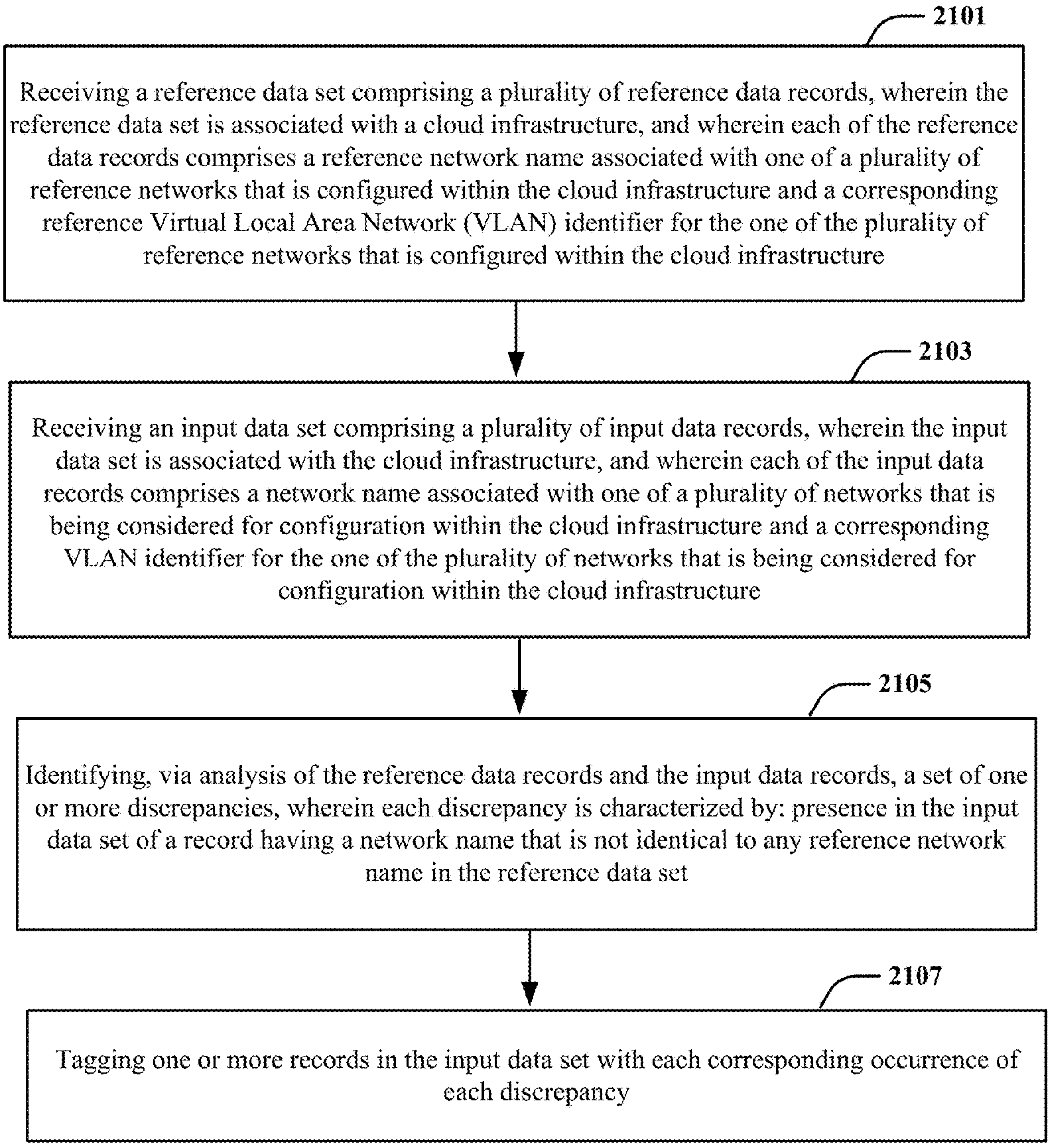
FIG. 2E depicts an illustrative embodiment of a method in accordance with various aspects described herein.

Referring now to FIG. 2E, various steps of a method 2100 according to an embodiment are shown. As seen in this FIG. 2E, step 2101 comprises receiving a reference data set comprising a plurality of reference data records, wherein the reference data set is associated with a cloud infrastructure, and wherein each of the reference data records comprises a reference network name associated with one of a plurality of reference networks that is configured within the cloud infrastructure and a corresponding reference Virtual Local Area Network (VLAN) identifier for the one of the plurality of reference networks that is configured within the cloud infrastructure. Next, step 2103 comprises receiving an input data set comprising a plurality of input data records, wherein the input data set is associated with the cloud infrastructure, and wherein each of the input data records comprises a network name associated with one of a plurality of networks that is being considered for configuration within the cloud infrastructure and a corresponding VLAN identifier for the one of the plurality of networks that is being considered for configuration within the cloud infrastructure. Next, step 2105 comprises identifying, via analysis of the reference data records and the input data records, a set of one or more discrepancies, wherein each discrepancy is characterized by: presence in the input data set of a record having a network name that is not identical to any reference network name in the reference data set. Next, step 2107 comprises tagging one or more records in the input data set with each corresponding occurrence of each discrepancy.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2F:
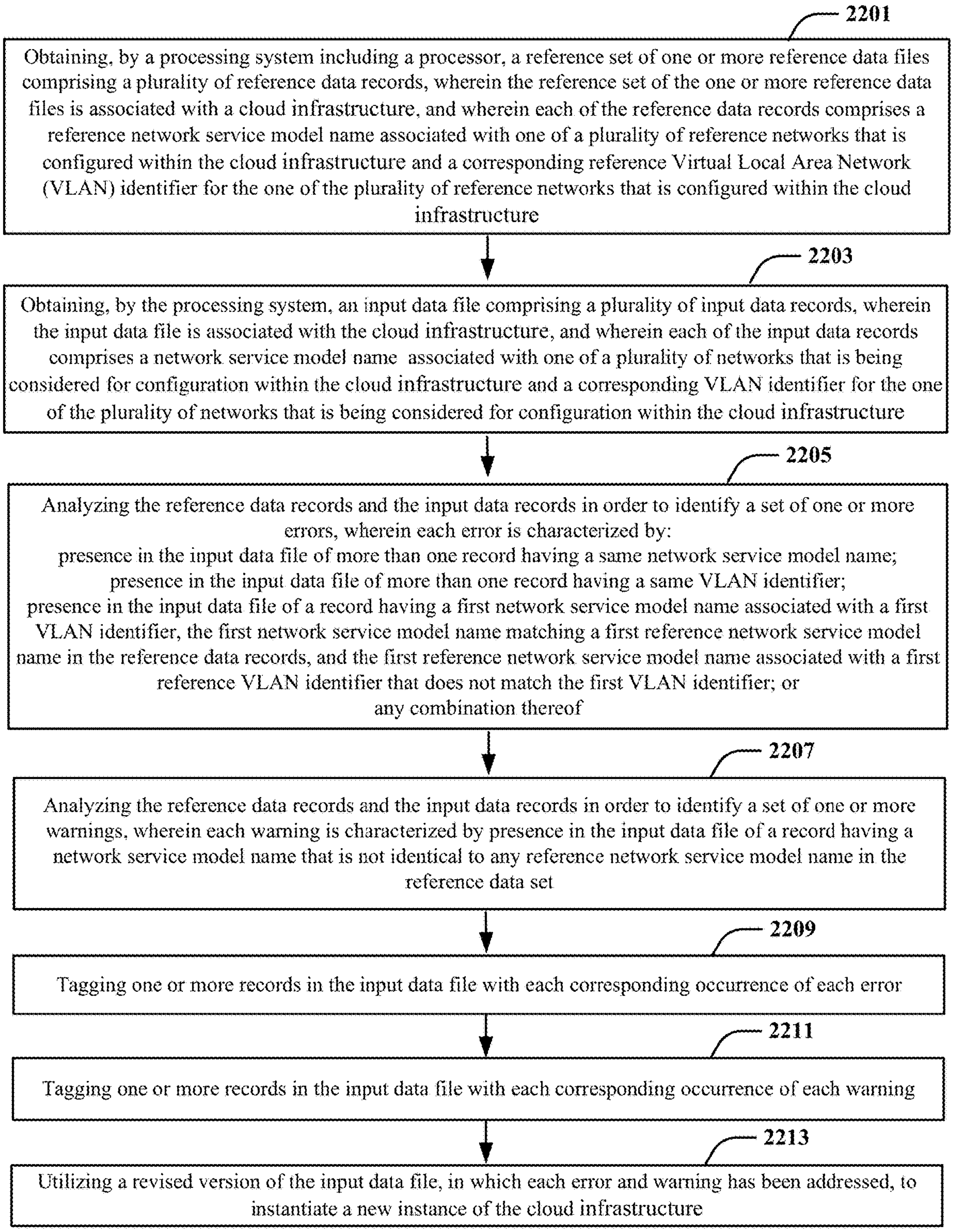
FIG. 2F depicts an illustrative embodiment of a method in accordance with various aspects described herein.

Referring now to FIG. 2F, various steps of a method 2200 according to an embodiment are shown. As seen in this FIG. 2F, step 2201 comprises obtaining, by a processing system including a processor, a reference set of one or more reference data files comprising a plurality of reference data records, wherein the reference set of the one or more reference data files is associated with a cloud infrastructure, and wherein each of the reference data records comprises a reference network service model name associated with one of a plurality of reference networks that is configured within the cloud infrastructure and a corresponding reference Virtual Local Area Network (VLAN) identifier for the one of the plurality of reference networks that is configured within the cloud infrastructure (in an embodiment, each reference set is associated with one cloud infrastructure). Next, step 2203 comprises obtaining, by the processing system, an input data file comprising a plurality of input data records, wherein the input data file is associated with the cloud infrastructure, and wherein each of the input data records comprises a network service model name associated with one of a plurality of networks that is being considered for configuration within the cloud infrastructure and a corresponding VLAN identifier for the one of the plurality of networks that is being considered for configuration within the cloud infrastructure. Next, step 2205 comprises analyzing the reference data records and the input data records in order to identify a set of one or more errors, wherein each error is characterized by: presence in the input data file of more than one record having a same network service model name; presence in the input data file of more than one record having a same VLAN identifier; presence in the input data file of a record having a first network service model name associated with a first VLAN identifier, the first network service model name matching a first reference network service model name in the reference data records, and the first reference network service model name associated with a first reference VLAN identifier that does not match the first VLAN identifier; or any combination thereof. Next, step 2207 comprises analyzing the reference data records and the input data records in order to identify a set of one or more warnings, wherein each warning is characterized by presence in the input data file of a record having a network service model name that is not identical to any reference network service model name in the reference data set. Next, step 2209 comprises tagging one or more records in the input data file with each corresponding occurrence of each error. Next, step 2211 comprises tagging one or more records in the input data file with each corresponding occurrence of each warning. Next, step 2213 comprises utilizing a revised version of the input data file, in which each error and warning has been addressed, to instantiate a new instance of the cloud infrastructure.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, in one embodiment, a Node.js program can read cloud infrastructure input plan data from spreadsheets, read network role reference data from spreadsheets, and produce a new spreadsheet containing desired output.

As described herein, various embodiments can utilize one or more computer systems or the like to detect network information (e.g., network name, VLAN identifier) and to create/update (e.g., using closed-loop automation) one or more data sets, data files, spreadsheets, databases, or the like.

As described herein, in various embodiments, a "network" can refer to connectivity that is configured in a cloud environment. In various examples, each such network can be virtual and can be instantiated to a cloud infrastructure. In one example, a "cloud zone" can refer to a specific instance in a cloud infrastructure.

As described herein, in various embodiments, a process can map already existing UUIDs from a reference database to networks in a corrected draft network (see, e.g., Corrected Draft Network 251 of FIG. 2C).

As described herein, in various embodiments, each reference set is associated with one (single) cloud infrastructure.

As described herein, various embodiments provide automated mechanisms to: (1) support a process of assigning network identifiers to network names (and/or to one or more additional characteristics); (2) support a process of validating network identifiers relative to network names (and/or to one or more additional characteristics); (3) support any combination thereof. In this regard, various embodiments can operate as follows:

a) A first phase of a process automates a verification of network identifiers and names and makes a best effort to output the correct network role information as found in one or more already existing reference cloud zone databases. This phase can also output (e.g., into a new cloud zone database) one or more error messages (including, for example, warnings of new networks that do not already exist).
b) Next, one or more users manually resolve the errors (e.g., by working with network engineers and/or operations personnel to manually input the network role information for the new networks that were not found in the existing reference database(s)).
c) A second phase maps the already existing network names and their machine-generated unique variant and invariant network identifiers (UUIDs) found in the reference cloud zone databases to the networks in the new cloud zone database (one or more users can manually create and add unique variant and invariant identifiers for new networks). The automated mechanisms can be configured to output multiple sets of network/UUID pairs to accommodate multiple cloud environments. For example, a particular cloud zone can be cloned in a plurality of "lab" environments plus a "production" environment. In this example, all data about each network in an environment is the same except for the UUIDs (that is, in this example, each environment's networks are assigned their own unique UUIDs).
d) The resulting information is prepared for upload to an Orchestration Platform or another instantiation system.

As described herein, various embodiments can be implemented as a computer program that takes as input: (1) a data file (such as an EXCEL spreadsheet) containing incomplete network and virtual network function (VNF)/containerized network function (CNF) virtual machine instantiation data; and (2) a set of reference data files (such as EXCEL spreadsheets) containing network names and identifiers to be used in validation and ID assignment for the purpose of creating a new cloud zone. The processing of these two inputs can be done via a combination of computer program and manual activity, and can result in the identification and elimination of errors as well as in the creation of accurate network name and identifier assignments. These assignments can then be written to data files (such as EXCEL spreadsheets) for consumption by an orchestration platform.

As described herein, in various embodiments a computer program can be used to facilitate one or more processes described herein. Such a computer program can be written in any desired programming language (e.g., Node.js (JavaScript), Python, Java). The operation of the program can be per standard data processing capabilities such as reading and writing ASCII files and reading and writing EXCEL files (if used).

As described herein, the process of network validation and unique ID assignment is traditionally highly complex, tedious and time consuming. In this regard, various embodiments can provide benefits such as helping to reduce costs (through the reduction of human error which would otherwise cause rework), and helping to improve revenue and customer satisfaction (e.g., by getting a given cloud zone to production faster).

As described herein, various embodiments provide a mechanism to identify (e.g., for a tenant in a cloud network) a list of errors/warnings (e.g., incorrect network roles, missing sub networks, network names not found because they are new).

As described herein, various embodiments provide a mechanism to facilitate "spinning-up" (or instantiating) in a cloud a model/service after verification and data assignment.

As described herein, in various embodiments a given record can comprise the following fields: Network Service Model Name; Model Type; Trunked (or not); Network Role in Network Model; Network Role in VNF; VLAN Assignment (in one example, must be unique across all records in a given cloud infrastructure).

As described herein, various embodiments provide benefits such as reduced time and cost required to create and maintain network identification assignments. Time and cost can be reduced, for example, in two ways. First, the automation according to various embodiments can reduce the effort required by a person to manipulate the data (which has traditionally been stored in EXCEL spreadsheets and manually copied/pasted/updated). Second, extensive auditing capabilities according to various embodiments can be built into the automation software in order to catch errors before they propagate (thereby eliminating the time and cost involved in finding and fixing associated errors). Various embodiments can help to eliminate costly (human) errors during network and virtual/containerized network function (VNF/CNF) instantiations due to: (a) mis-assigned network roles; (b) mis-assigned unique machine IDs (UUIDs); (c) duplication of network names or virtual network IDs (VLAN-IDs); (d) any combination thereof. In one example, a given cloud zone may have 100 or more networks with 10 or more attributes (there may also be multiple cloud zones). Due to this high amount of data, it is a daunting (if not impossible) task for a human to validate and ensure uniqueness among networks as well as to find and correct various typographical errors. In one example, errors have traditionally occurred about 10-20% of the time and have required at least 2 people 2-3 effort days to tear down and rebuild the correct networks and tear down and re-spin the network functions (various embodiments may significantly reduce the amount of effort required in this regard).

As described herein, various embodiments can be implemented by one or more network providers (e.g., one or more cloud network providers) to facilitate assigning network identifiers in a cost-effective and error-free manner.

As described herein, various embodiments can be implemented in the form of hardware, firmware, software, or any combination thereof.

Figure 3:
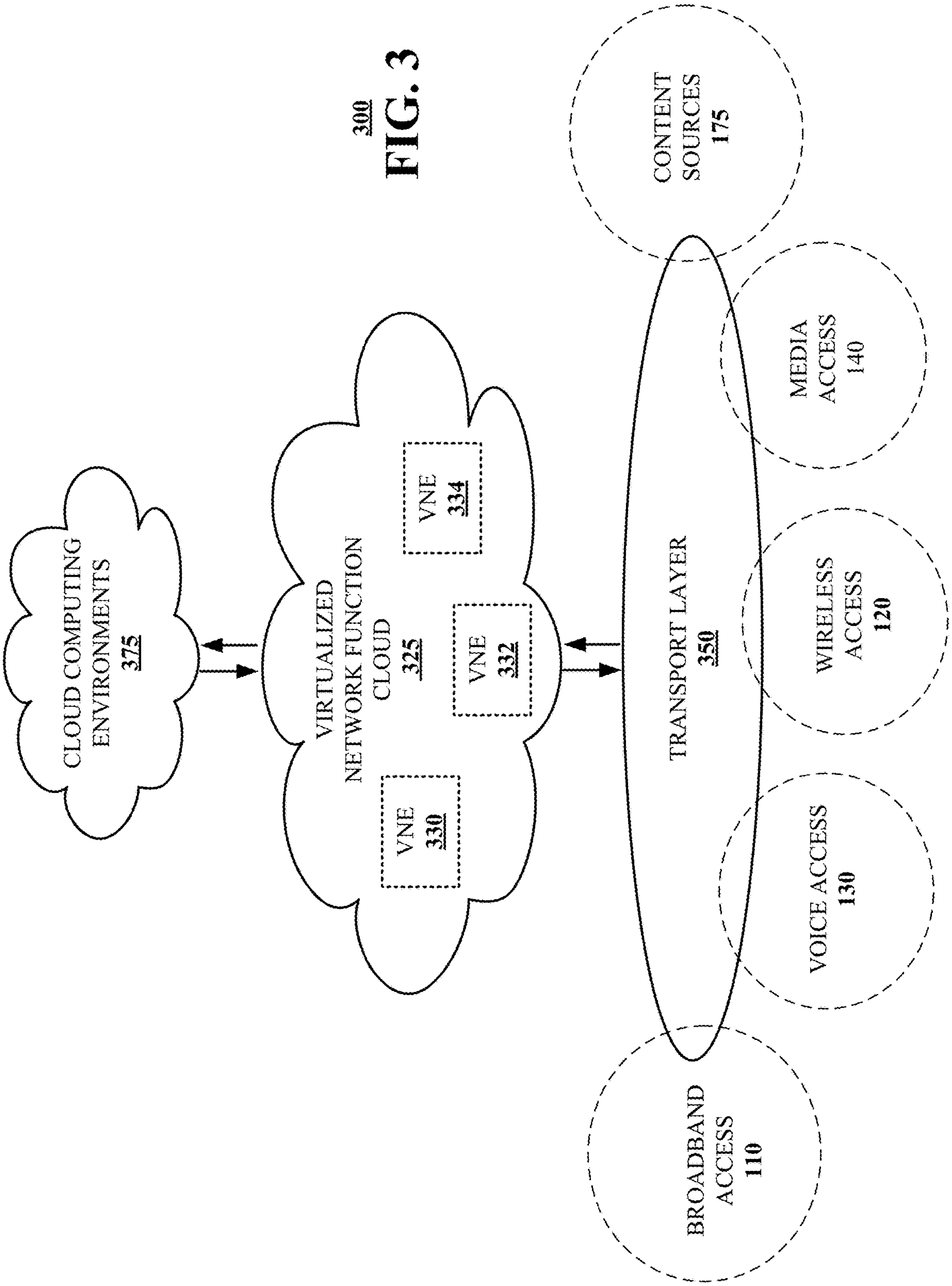
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, some or all of the subsystems and functions of system 200, some or all of the subsystems and functions of system 230, some or all of the subsystems and functions of system 250, and/or some or all of the functions of methods 2000, 2100, 2200. For example, virtualized communication network 300 can facilitate in whole or in part assigning (for a cloud infrastructure) various network names and corresponding identifiers to respective records (e.g., records in a data set, records in a data file, records in a spreadsheet, records in a database, or the like) and/or verifying (for the cloud infrastructure) various network names and corresponding identifiers in respective records (e.g., records in a data set, records in a data file, records in a spreadsheet, records in a database, or the like).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
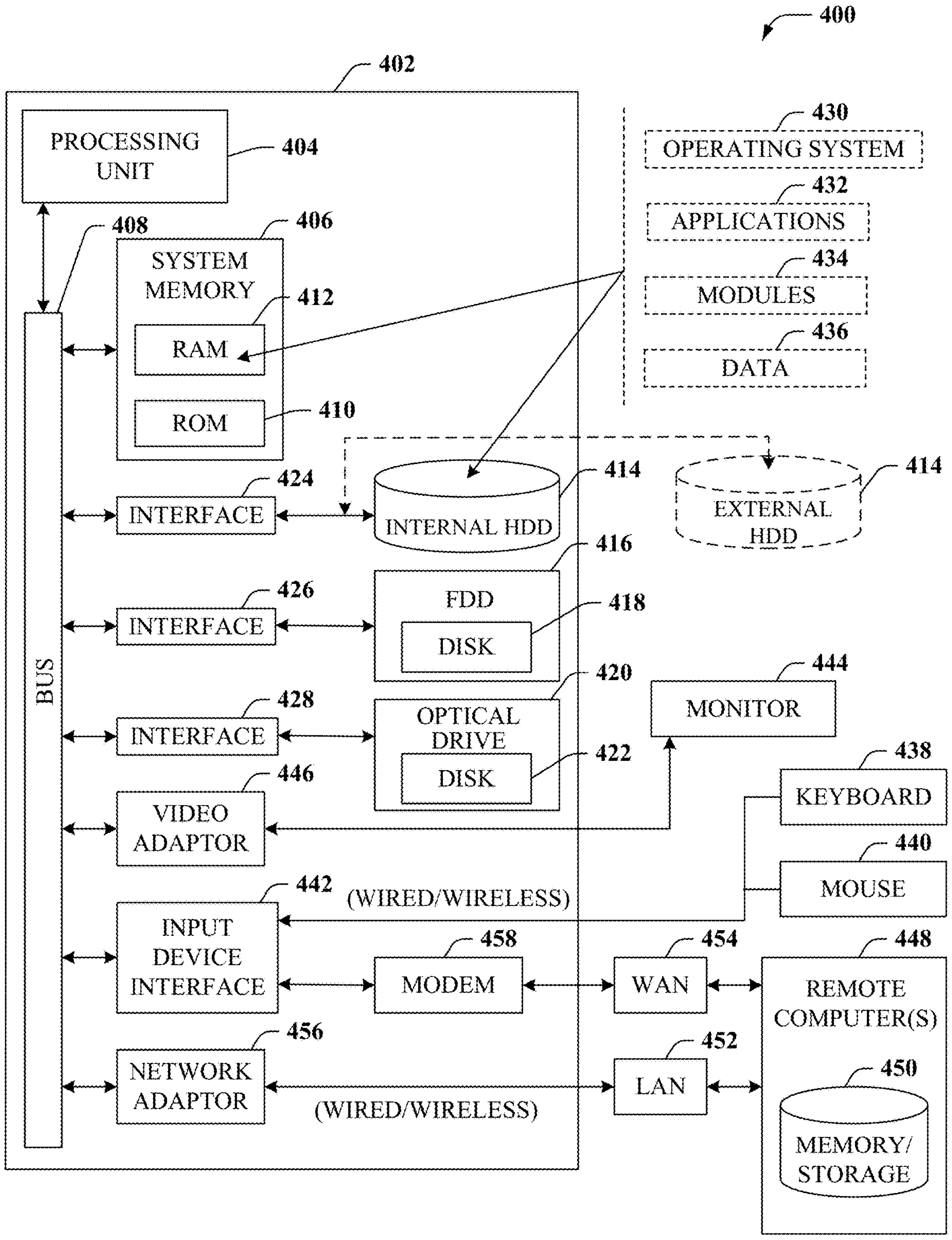
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part assigning (for a cloud infrastructure) various network names and corresponding identifiers to respective records (e.g., records in a data set, records in a data file, records in a spreadsheet, records in a database, or the like) and/or verifying (for the cloud infrastructure) various network names and corresponding identifiers in respective records (e.g., records in a data set, records in a data file, records in a spreadsheet, records in a database, or the like).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
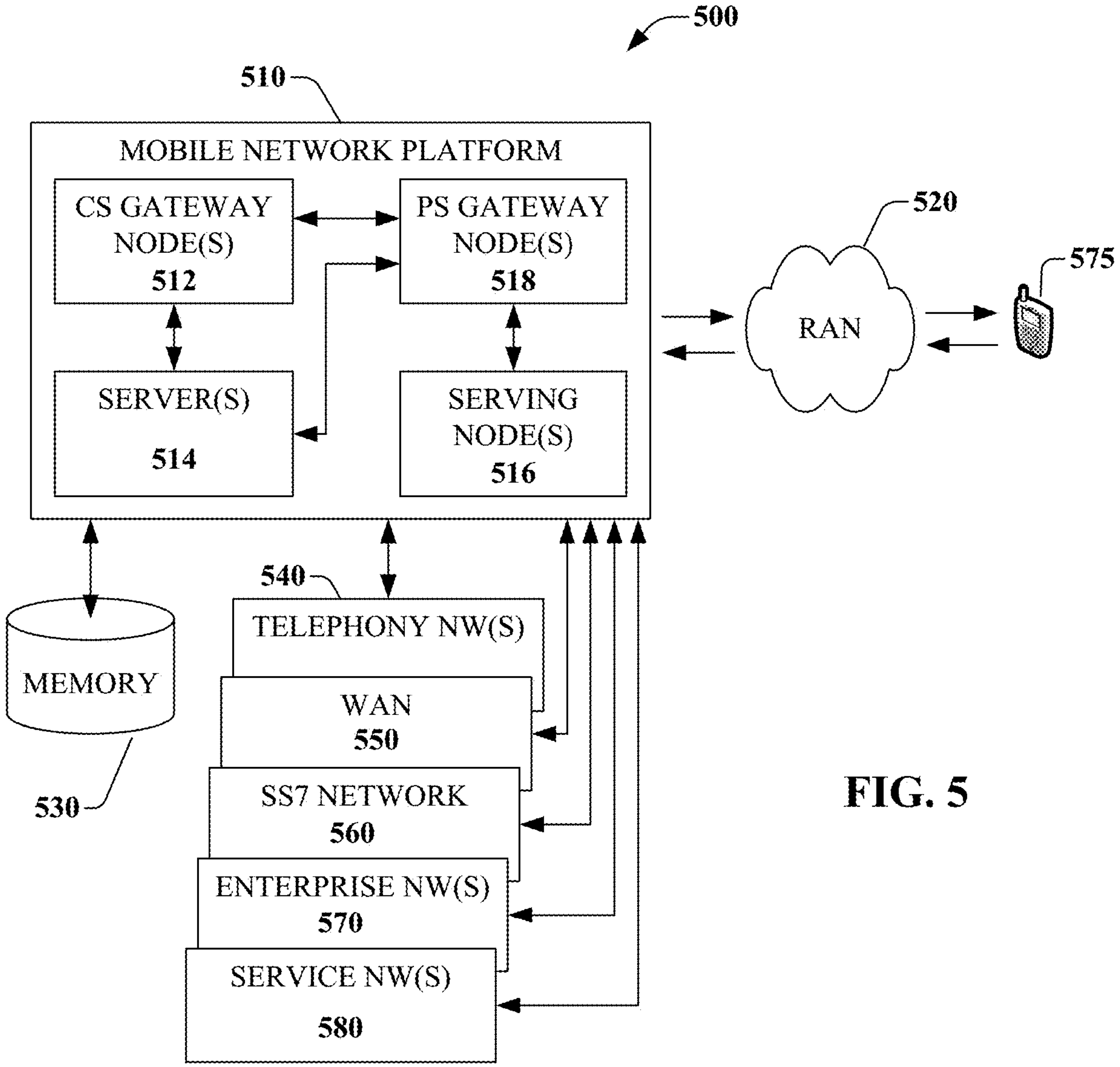
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part assigning (for a cloud infrastructure) various network names and corresponding identifiers to respective records (e.g., records in a data set, records in a data file, records in a spreadsheet, records in a database, or the like) and/or verifying (for the cloud infrastructure) various network names and corresponding identifiers in respective records (e.g., records in a data set, records in a data file, records in a spreadsheet, records in a database, or the like). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
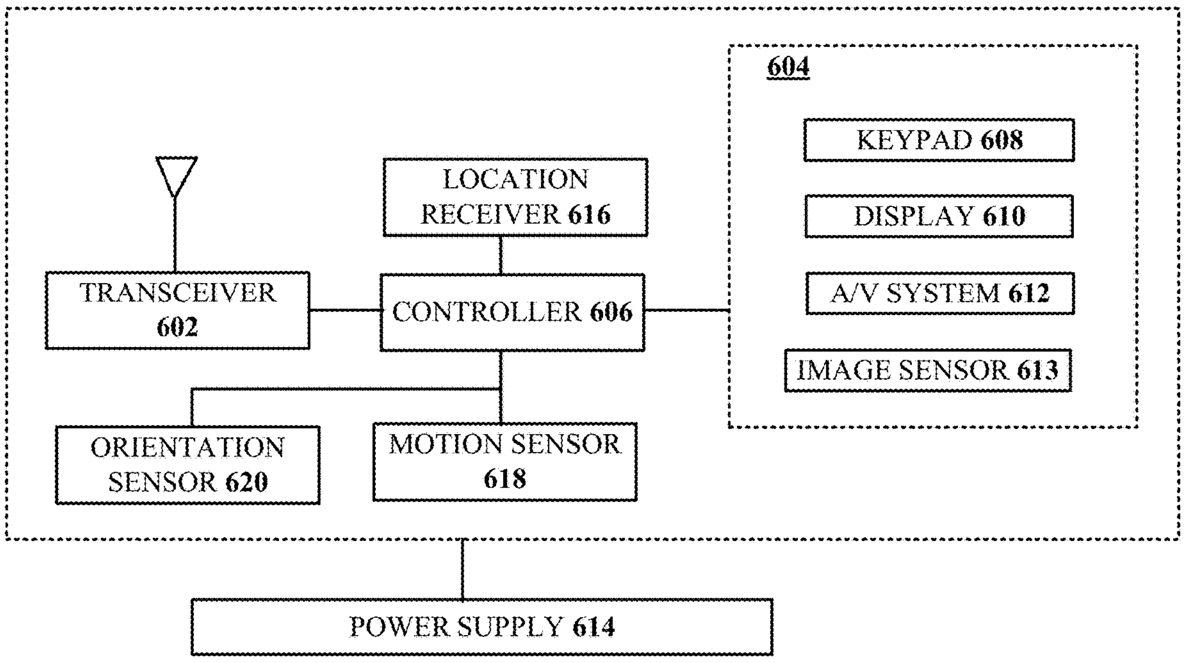
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part assigning (for a cloud infrastructure) various network names and corresponding identifiers to respective records (e.g., records in a data set, records in a data file, records in a spreadsheet, records in a database, or the like) and/or verifying (for the cloud infrastructure) various network names and corresponding identifiers in respective records e.g., records in a data set, records in a data file, records in a spreadsheet, records in a database, or the like).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically assigning (for a cloud infrastructure) various network names and corresponding identifiers to respective records (e.g., records in a data set, records in a data file, records in a spreadsheet, records in a database, or the like) and/or verifying (for the cloud infrastructure) various network names and corresponding identifiers in respective records (e.g., records in a data set, records in a data file, records in a spreadsheet, records in a database, or the like)) can employ various AI-based schemes for carrying out various embodiments thereof. Moreover, the classifier can be employed to determine a ranking or priority of each network name, network identifier, record, spreadsheet, dataset, and/or file. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the network names, network identifiers, records, spreadsheets, datasets, and/or files should receive priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, implement operations, the operations comprising:

obtaining an input data set comprising a plurality of input data records, wherein the input data set is associated with a cloud infrastructure, and wherein each of the input data records comprises a network name associated with one of a plurality of networks that is being considered for configuration within the cloud infrastructure and a corresponding Virtual Local Area Network (VLAN) identifier for the one of the plurality of networks that is being considered for configuration within the cloud infrastructure;

analyzing a plurality of reference data records of a reference data set and the input data records in order to identify a set of one or more errors, wherein the reference data set is associated with the cloud infrastructure, wherein each of the reference data records comprises a reference network name associated with one of a plurality of reference networks that is configured within the cloud infrastructure and a corresponding reference VLAN identifier for the one of the plurality of reference networks that is configured within the cloud infrastructure, and wherein each error is characterized by presence in the input data set of more than one record having a same network name;

tagging one or more records in the input data set with each corresponding occurrence of each error; and utilizing a revised version of the input data set, in which each error has been addressed, to instantiate a new instance of the cloud infrastructure, wherein each error is addressed by changing an input data record in the input data set to conform to a corresponding reference data record in the reference data set.

2. The device of claim 1, wherein:

the operations further comprise adding, to the revised version of the input data set in which each error has been corrected, one or more machine-generated identifiers, each machine-generated identifier being unique within the revised version of the input data set relative to each other machine-generated identifier.

3. The device of claim 2, wherein the revised version of the input data set, to which the one or more machine-generated identifiers has been added, is utilized to instantiate the new instance of the cloud infrastructure.

4. The device of claim 2, wherein each machine-generated identifier is an alpha-numeric string that results from a modeling process.

5. The device of claim 2, wherein the operations further comprise generating the revised version of the input data set in which each error is corrected.

6. The device of claim 1, wherein the operations further comprise analyzing the reference data records and the input data records in order to identify a set of one or more warnings, wherein each warning is characterized by presence in the input data set of a record having a network name that is not identical to any reference network name in the reference data set.

7. The device of claim 1, wherein the cloud infrastructure comprises one or more wireless networking components, one or more non-wireless networking components, or any combination thereof.

8. The device of claim 7, wherein the one or more wireless networking components are part of a fourth generation (4G) cellular network, a fifth generation (5G) cellular network, a sixth generation (6G) cellular network, a subsequent generation cellular network, or any combination thereof.

9. The device of claim 1, wherein the input data set is associated with one environment selected from a plurality of environments.

10. The device of claim 9, wherein the plurality of environments comprises one or more laboratory environments and a production environment.

11. The device of claim 10, wherein:

the one or more laboratory environments comprise a first laboratory environment and a second laboratory environment;

the input data set is associated with the first laboratory environment; and the operations further comprise, subsequent to the tagging of the input data set:

obtaining another input data set comprising another plurality of input data records, wherein the another input data set is associated with the cloud infrastructure and with the second laboratory environment, and wherein each of the another input data records comprises another network name associated with one of another plurality of networks that is being considered for configuration within the cloud infrastructure and another corresponding VLAN identifier for the another one of the plurality of networks that is being considered for configuration within the cloud infrastructure;

analyzing the reference data records and the another input data records in order to identify another set of one or more errors, wherein each another error is characterized by:

presence in the another input data set of more than one record having a same network name;

presence in the another input data set of more than one record having a same VLAN identifier;

presence in the another input data set of a record having another first network name associated with another first VLAN identifier, the another first network name matching another first reference network name in the reference data records, and the another first reference network name associated with another first reference VLAN identifier that does not match the another first VLAN identifier; or any combination thereof; and tagging one or more records in the another input data set with each corresponding occurrence of each another error.

12. The device of claim 1, wherein:

each VLAN identifier is an integer number;

the reference data set comprises a first data source; and the input data set comprises a second data source.

13. The device of claim 12, wherein:

each of the first data source and the second data source is obtained by a batch process; and the batch process, once initiated, is performed automatically and without human interaction.

14. The device of claim 1, wherein:

the reference data set comprises a first spreadsheet; and the input data set comprises a second spreadsheet.

15. The device of claim 1, wherein the cloud infrastructure implements communication with a plurality of mobile communication devices, a plurality of non-wireless communication devices, or any combination thereof.

16. The device of claim 15, wherein each of the plurality of mobile communication devices comprises one of a smartphone, a cellular phone, a tablet computer, a laptop computer, a notebook computer, or any combination thereof, and wherein each of the plurality of non-wireless communication devices comprises one of a desktop computer, a server, or any combination thereof.

17. A non-transitory machine-readable medium comprising executable instructions that, when executed by a processing system including a processor, implement operations, the operations comprising:

receiving an input data set in a second spreadsheet comprising a plurality of input data records, wherein the input data set is associated with a cloud infrastructure, and wherein each of the input data records comprises a network name associated with one of a plurality of networks that is being considered for configuration within the cloud infrastructure and a corresponding Virtual Local Area Network (VLAN) identifier for the one of the plurality of networks that is being considered for configuration within the cloud infrastructure;

identifying, via analysis of a plurality of reference data records of a reference data set and the input data records, a set of one or more discrepancies, wherein the reference data set is in a first spreadsheet, wherein the reference data set is associated with the cloud infrastructure, wherein each of the reference data records comprises a reference network name associated with one of a plurality of reference networks that is configured within the cloud infrastructure and a corresponding reference VLAN identifier for the one of the plurality of reference networks that is configured within the cloud infrastructure, and wherein each discrepancy is characterized by presence in the input data set of a record having a network name that is not identical to any reference network name in the reference data set;

tagging one or more records in the input data set with each corresponding occurrence of each discrepancy; and utilizing a revised version of the input data set, in which each discrepancy has been addressed, to instantiate a new instance of the cloud infrastructure, wherein each discrepancy is addressed by changing an input data record in the input data set to conform to a corresponding reference data record in the reference data set.

18. The non-transitory machine-readable medium of claim 17, wherein each discrepancy is further characterized by:

presence in the input data set of more than one record having a same network name;

presence in the input data set of more than one record having a same VLAN identifier;

presence in the input data set of a record having a first network name associated with a first VLAN identifier, the first network name matching a first reference network name in the reference data records, and the first reference network name associated with a first reference VLAN identifier that does not match the first VLAN identifier; or any combination thereof.

19. A method, comprising:

obtaining, by a processing system including a processor, an input data file comprising a plurality of input data records, wherein the input data file is associated with a cloud infrastructure, and wherein each of the input data records comprises a network service model name associated with one of a plurality of networks that is being considered for configuration within the cloud infrastructure and a corresponding Virtual Local Area Network (VLAN) identifier for the one of the plurality of networks that is being considered for configuration within the cloud infrastructure;

analyzing a plurality of reference data records of a reference set of one or more reference data files and the input data records in order to identify a set of one or more errors, wherein the reference set of the one or more reference data files is associated with a cloud infrastructure, wherein each of the reference data records comprises a reference network service model name associated with one of a plurality of reference networks that is configured within the cloud infrastructure and a corresponding reference VLAN identifier for the one of the plurality of reference networks that is configured within the cloud infrastructure, and wherein each error is characterized by:

presence in the input data file of more than one record having a same network service model name;

presence in the input data file of more than one record having a same VLAN identifier;

presence in the input data file of a record having a first network service model name associated with a first VLAN identifier, the first network service model name matching a first reference network service model name in the reference data records, and the first reference network service model name associated with a first reference VLAN identifier that does not match the first VLAN identifier; or any combination thereof;

analyzing the plurality of reference data records and the input data records in order to identify a set of one or more warnings, wherein each warning is characterized by presence in the input data file of a record having a network service model name that is not identical to any reference network service model name in the reference data set;

tagging one or more records in the input data file with each corresponding occurrence of each error;

tagging one or more records in the input data file with each corresponding occurrence of each warning; and utilizing a revised version of the input data file, in which each error and warning has been addressed, to instantiate a new instance of the cloud infrastructure, wherein each error is addressed by changing an input data record in the input data file to conform to a corresponding reference data record in the reference data file, and wherein each warning is addressed by updating an input data record in the input data file with information that is not present in the reference data file.

20. The method of claim 19, wherein:

the cloud infrastructure is a cloud zone; and the new instance of the cloud infrastructure is a new cloud zone.

* * * * *